United States Patent [19]

Lafont

[11] 3,951,227
[45] Apr. 20, 1976

[54] GROUND-EFFECT VEHICLES
[75] Inventor: André Lafont, Paris, France
[73] Assignee: Societe d'Etudes et de Developpement des Aeroglisseurs Marins, Terrestres et Amphibies S.E.D.A.M., Paris, France
[22] Filed: Dec. 26, 1974
[21] Appl. No.: 536,522

[30] Foreign Application Priority Data
Jan. 4, 1974  France .............................. 74.00247

[52] U.S. Cl. ................................ 180/121; 180/127
[51] Int. Cl.² ............................................ B60V 1/16
[58] Field of Search ......................... 180/116–127

[56] References Cited
UNITED STATES PATENTS

| | | |
|---|---|---|
| 3,395,772 | 8/1968 | Francis et al. .................. 180/121 X |
| 3,420,330 | 1/1969 | Bliss ................................ 180/127 X |
| 3,504,755 | 4/1970 | Bliss ................................ 180/118 |
| 3,513,933 | 5/1970 | Faure ................................ 180/121 |
| 3,561,559 | 2/1971 | Delamare .......................... 180/121 X |
| 3,680,657 | 8/1972 | Marchetti et al. ................. 180/121 |
| 3,811,527 | 5/1974 | Pont et al. ........................ 180/121 |

Primary Examiner—M. H. Wood, Jr.
Assistant Examiner—Terrance L. Siemens
Attorney, Agent, or Firm—Alan H. Levine

[57] ABSTRACT

An air-cushion, or ground-effect, vehicle is described which includes a central cushion defining assembly of skirts and a peripheral cushion defining assembly of skirts.

The skirts of the central assembly are of lobe-like section and the skirts of the peripheral assembly are cylindrical. Any given skirt of the peripheral assembly is in contact with each two, like, adjacent skirts and with two of the skirts of the central assembly.

7 Claims, 5 Drawing Figures

GROUND-EFFECT VEHICLES

BACKGROUND OF THE INVENTION

1. Field of the Invention

This invention relates to air-cushion vehicles.

2. Description of the prior art

An air-cushion vehicle is described in U.S. Pat. No. 3,811,527 to Pont et Al comprising a platform carrying a source of pressurized air, which platform is supported, in operation, by a central air support cushion surrounded by a peripheral, partitioned, air-cushion assembly, the supply from the pressurized air source of the central cushion and of the peripheral assembly being effected through the intermediary of a distributing space formed below the platform. The distributing space is at least partly sub-divided into a plurality of sectors by partitions extending in a direction inwardly from the peripheral assembly, and means are provided for controlling differentially the air flow supplied to the various sectors.

In such a vehicle, the central cushions forming the "plenum chamber" are defined by a peripheral skirt, termed the internal peripheral skirt, and the peripheral support assembly comprises, for at least one of the distributing sectors, a series of so-called annular skirts which are contiguous and at least in part tangential to one another and to the internal skirt which they surround.

It is known that in such an assembly, the internal pressure of the central cushion remains substantially constant in the course of the movement of the vehicle, while in contrast the pressures in the annular skirts vary within large limits. Such mode of support in analogous to a spring suspension which comprises a large central spring (equivalent to the central cushion) of substantially uniform stiffness, and a plurality of peripheral springs (analogous to the annular skirts of the peripheral assembly) which will have non-uniform stiffnesses.

Research carried out by the Applicant has confirmed the basic viability of such a support system.

It is, however, apparent that two difficulties arise in the internal skirt assembly and the annular skirts of the peripheral assembly. In certain extreme operational conditions certain thermal damage to and sagging of the annular skirt can occur. Further, some vibration has been noted and even slight deformation has been observed of the annular skirts, these phenomena appearing to result from pressures arising in the interstitial spaces between the annular skirts and the internal skirt assembly.

It is an object of the present invention to overcome these disadvantages.

SUMMARY OF THE INVENTION

According to the present invention there is provided in an air-cushion vehicle, a platform, means defining a central air-cushion space, said means being formed by a plurality of adjacent skirts of lobe-like section together delimiting an internal skirt assembly, and means defining a peripheral air-cushion space, said peripheral air-cushion defining means being formed by a plurality of separate skirts, each skirt of the peripheral air-cushion defining means being in contact with two adjacent such skirts and also in contact with two adjacent skirts of lobe-like section of the internal skirt assembly.

BRIEF DESCRIPTION OF THE DRAWINGS

The invention will now be described, by way of example, with reference to the accompanying diagrammatic drawings, in which.

DESCRIPTION OF THE PREFERRED EMBODIMENTS

Figure 1:
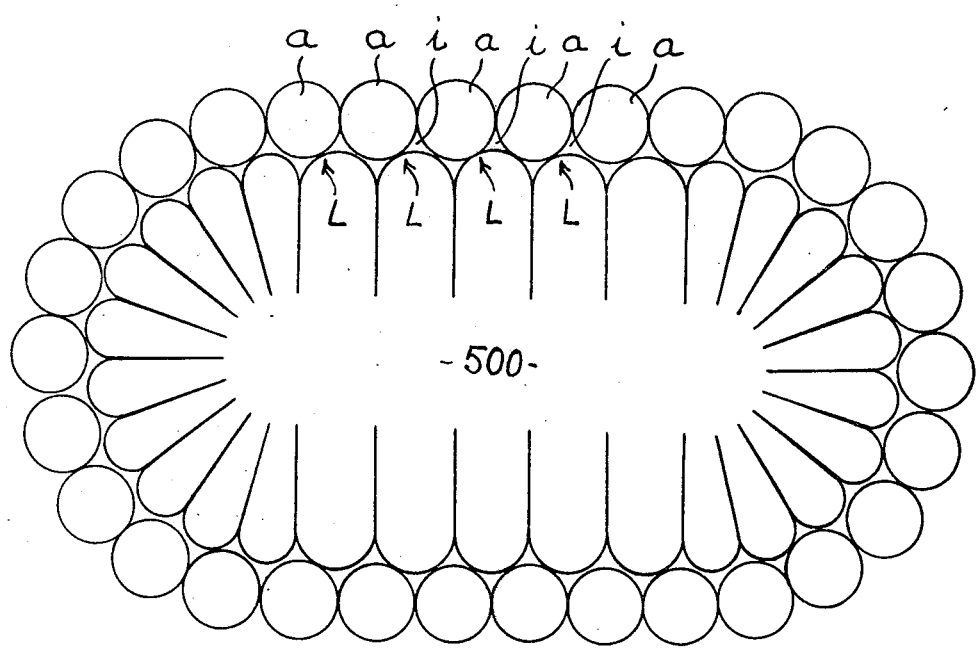
FIGS. 1 and 2 are diagrammatic plan views showing two embodiments of skirt assemblies in accordance with the invention each relating to an air cushion vehicle of generally elongate form.
Figure 2:
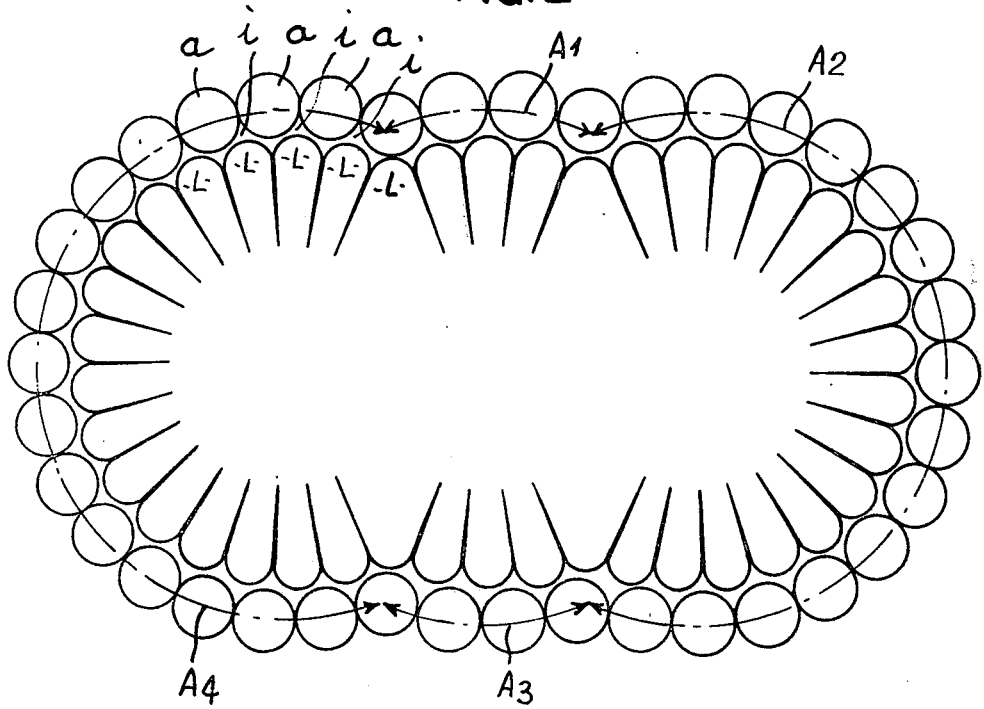

FIGS. 1 and 2 each show an internal skirt constituted by a plurality of lobe-like sections, herein termed "lobes" L, juxtaposed to one another and together defining a central cushion space 500.

A peripheral skirt assembly comprises a plurality of skirts $a$ which together define a hollow figure, herein termed an annulus. Each skirt $a$ is of generally cylindrical form. It is in contact with two adjacent like skirts $a$, preferably tangential to one another if the skirts are cylindrical. Each skirt $a$ is in contact with an outer portion of the two adjacent lobes L and preferably is also tangential to these lobes.

Figure 3:
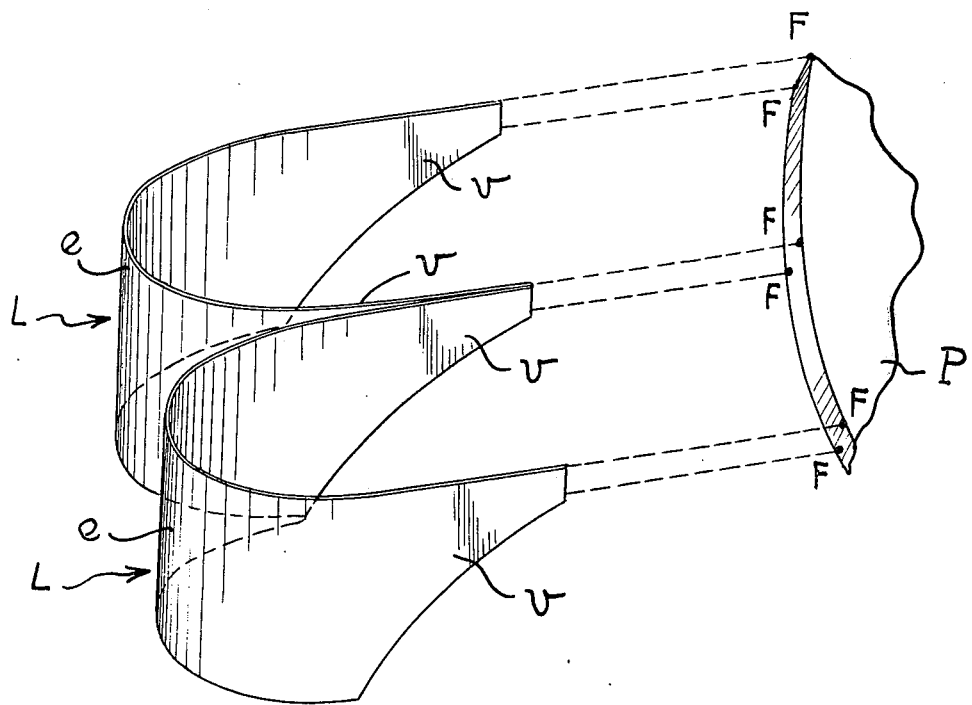
FIGS. 3 show diagrammatically and in perspective details of internal skirts of each of the embodiments.

Such an arrangement of central cushion space and peripheral assembly improves the structural cohesion of the assembly skirt as a whole and the cross-section of the interstial spaces $i$ is substantially reduced in comparison with the teaching of U.S. Pat. No. 3,811,527 to Pont et Al (also to British Patent No. 1,381,116). Each lobe L, as shown in FIG. 3 comprises a central external part $e$ which is part-cylindrical or slightly frusto-conical and also comprises two lateral wings $v$. The central skirt is constructed by assembling together adjacent lobes at their wings $v$, this assembling being effected by any known means. Moreover, each wing $v$ is secured at at least one fixed point F rigid with the platform P of the air cushion vehicle. In FIG. 3, the connections between adjacent wings have been diagrammatically indicated by broken lines. The wings $v$ themselves may abut the points F but alternatively one or more connecting cables may connect points F with the wings $v$ and thus form extensions of the latter. A single, common, cable may also be used to connect two contiguous wings of two adjacent lobes to a securing point F.

While in FIG. 1, the internal or central skirt assembly, formed by a plurality of lobes L, does not include any discontinuity in its general convexity, FIG. 2 shows an internal or central skirt assembly incorporating such changes in curvature, the lobes being arranged, as shown in the Figure along a series of arcs $A_1$, $A_2$, $A_3$, $A_4$.

Figure 4:
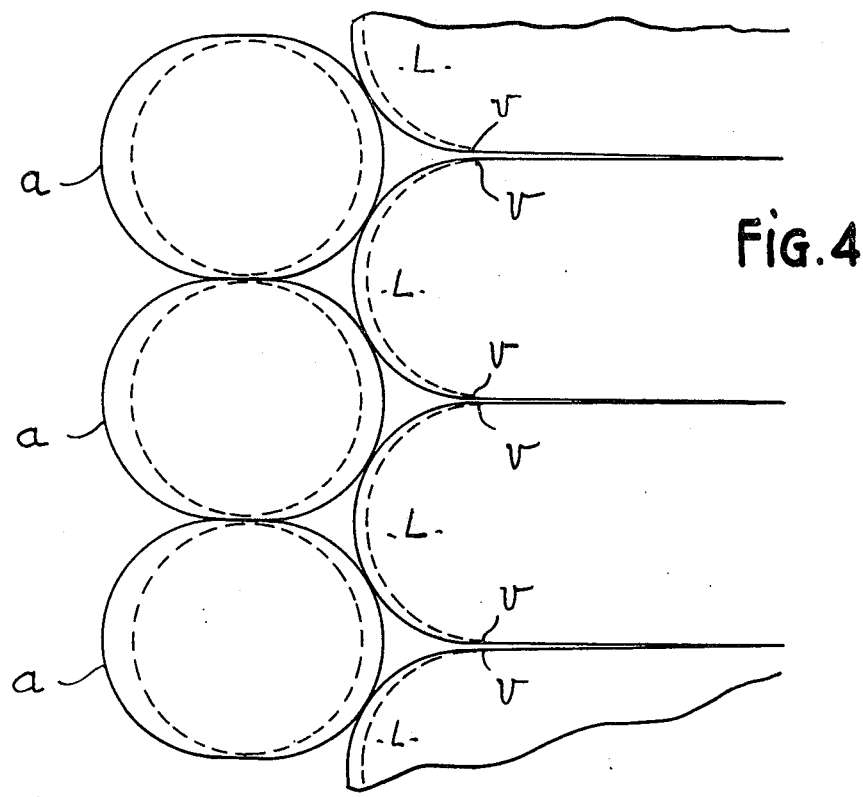
FIGS. 4 and 5 are detailed plan views illustrating the shapes of various skirts in accordance with the invention.
Figure 5:
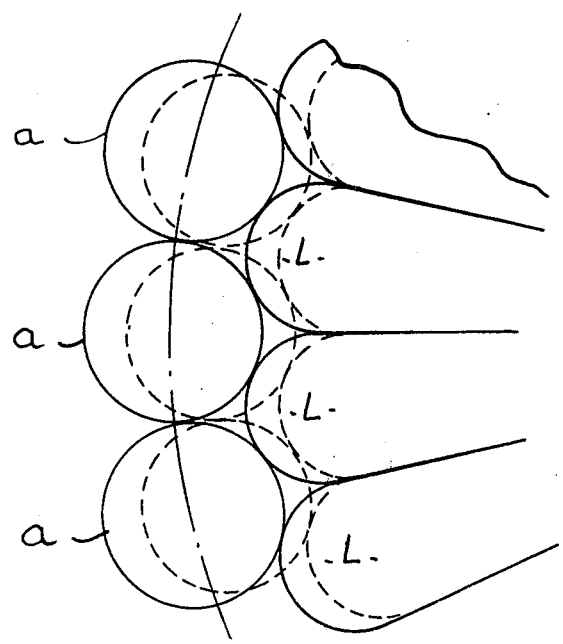

FIGS. 4 and 5 show diagrammatically shapes and relative arrangements of the lobes L of the internal or central skirt assembly and of the peripheral skirt assembly. The views are from above. The full lines show the contour of the skirs at their upper parts, and the broken lines the contours of the skirts at their lower parts.

In FIG. 4, each skirt $a$ of the peripheral assembly is slightly frusto-conical, the upper part being larger than the lower part. The skirts $a$ may also be slightly reentrant from the top to the bottom while the outer part $e$ of the lobes L of the central skirt assembly is substantially cylindrical while at the same time being also slightly re-entrant.

In FIG. 5, each skirt $a$ is substantially cylindrical, and has a re-entrant obliquity, the lobes L having, at their central part $e$ a corresponding obliquity.

I claim:
1. An air-cushion vehicle comprising:
  a platform,
  an internal skirt assembly carried by said platform and defining a central air-cushion space, said internal skirt assembly being formed by a plurality of adjacent lobe-like skirts, and
  a peripheral skirt assembly defining a peripheral air-cushion space, said peripheral skirt assembly being formed by a plurality of separate tubular skirts each having a closed cross-sectional shape,
  each skirt of said peripheral skirt assembly being in contact with two adjacent skirts of said peripheral skirt assembly and also in contact with two adjacent lobe-like skirts of said internal skirt assembly.
2. A vehicle according to claim 1, wherein each skirt of lobe-like section comprises
  an outer part,
  two wings extending inwardly form the outer part and
  means connecting the wings to fixed points on the platform.
3. A vehicle according to claim 1, wherein the interal skirt assembly is, overall, of convex form without discontinuity.
4. A vehicle according to claim 1, wherein the internal skirt assembly is, overall, formed by a plurality of convex arcs which are discontinuous with respect to one another.
5. A vehicle according to claim 1, wherein each skirt of the peripheral skirt assembly is frusto-conical.
6. A vehicle according to claim 1, wherein each skirt of the peripheral skirt assembly is of oblong, inclined form.
7. A vehicle according to claim 1, wherein each skirt of the peripheral skirt assembly is inclined downwardly and inwardly and the peripheral parts of each skirt of lobe-like section are correspondingly inclined downwardly and inwardly.

* * * * *